US007464914B2

(12) United States Patent
Arzouman

(10) Patent No.: US 7,464,914 B2
(45) **Date of Patent: *Dec. 16, 2008**

(54) ROBUST CONSUMER LIFTING DEVICE-POWER UNIT

(76) Inventor: Harry H. Arzouman, 26 Mainsail Dr., Corona Del Mar, CA (US) 92625

( * ) Notice: Subject to any disclaimer, the term of this patent is extended or adjusted under 35 U.S.C. 154(b) by 56 days.

This patent is subject to a terminal disclaimer.

(21) Appl. No.: 11/590,470

(22) Filed: Oct. 31, 2006

(65) Prior Publication Data

US 2008/0099749 A1 May 1, 2008

(51) Int. Cl.

| | |
|---|---|
| ***B60P 1/48*** | (2006.01) |
| ***B66F 7/10*** | (2006.01) |
| ***B66F 7/12*** | (2006.01) |
| ***B66F 3/24*** | (2006.01) |
| ***B66F 3/42*** | (2006.01) |
| *B66F 3/00* | (2006.01) |

(52) U.S. Cl. .................... 254/8 B; 254/89 H; 254/93 H

(58) Field of Classification Search ................. 254/8 B, 254/89 H, 93 H, DIG. 1

See application file for complete search history.

(56) References Cited

U.S. PATENT DOCUMENTS 3,746,307 A * 7/1973 Yamazaki ................... 254/126
4,314,691 A * 2/1982 Sato ........................... 254/126
4,589,630 A * 5/1986 Arzouman .................. 254/7 B
6,565,068 B1 * 5/2003 Arzouman .................. 254/126
6,722,634 B1 * 4/2004 Hsu ........................... 254/8 B
6,779,780 B2 * 8/2004 Arzouman .................. 254/8 B
6,986,503 B2 * 1/2006 Arzouman .................. 254/8 B
7,137,615 B2 * 11/2006 Ray, Jr. et al. ............ 254/10 B
2003/0218157 A1 * 11/2003 Arzouman .................. 254/8 B
2003/0218160 A1 * 11/2003 Arzouman .................. 254/8 B
2004/0065871 A1 * 4/2004 Hsu ........................... 254/8 B

* cited by examiner

*Primary Examiner*—Joseph J. Hail, III
*Assistant Examiner*—Alvin J Grant
(74) *Attorney, Agent, or Firm*—Roger C. Turner

(57) ABSTRACT

A power unit includes a rectangular frame base having a left shoe and a right shoe having a longitudinal track on their inner sides, a forward end having a support plate for receiving a jack stand, and a rearward end having a rear plate with an aperture for receiving an actuator shaft. A screw-threaded actuator shaft has a distal portion, and a proximal end extending through the aperture of the rear plate. A lateral screw axel has a threaded aperture receiving the distal end of the actuator shaft, and has its ends extending into the respective left and right track of the shoes. Two parallel lift arms have forward ends, and have rearward ends pivotally attached to the lateral axel. Two parallel connecting arms have forward ends pivotally attached to the forward ends of the shoes, and have rearward ends pivotally attached on the lift arms. Leveling pads are pivotally attached to the forward ends of the lift arms. An automatic-slide-forward-lift bridge is adapted to traverse along the lift arms, whereby the power unit is alternatively operable as a load lifting jack.

12 Claims, 13 Drawing Sheets

ROBUST CONSUMER LIFTING DEVICE-POWER UNIT

CROSS REFERENCE TO RELATED APPLICATIONS:

Applications have been filed directed to a Robust Consumer Lifting Device -Power Unit, -Slide Forward Bridge, -Trunk Jack, and -Three-Stage Jack Stand, as described in the present specification.

BACKGROUND OF THE INVENTION

The invention relates to a consumer system for lifting and supporting an object i.e. a corner of an automobile; particularly to a robust consumer jack, and also to a robust two part jacking system including a power unit that can be used to place and elevate a jack stand, and further to a three-stage jack stand. The inventor of the present invention is a pioneer of the two part jacking system holding numerous issued patents for a two part jacking system and related processes, some of which are described below.

Briefly, the commercial two part jacking system consists of a power unit and a set of separate mechanical jack stands. Examples of the two part jacking system and mobile power unit are described in detail in Re.32,715 and U.S. Pat. No. 4,589,630. Some examples of the jack stands are described in detail in U.S. Pat. Nos. 4,553,772; 4,490,264; 5,110,089; 5,183,235 and 5,379,974. The stands are capable of being vertically extended and retracted from the garage floor or road surface and, when extended, can be locked in place at any desired position by a ratchet and pawl assembly. The commercial power unit has a wheeled mobile chassis adapted to carry a plurality of the jack stands, and has a pair of lift arms adapted to mate with the outermost jack stand for placement and removal.

In use, the commercial mobile power unit is operated from its handle. It is maneuvered under a vehicle to place a jack stand in a desired location for lifting and supporting the vehicle. The power unit is activated from the handle, and the jack stand is then extended vertically to the desired height, thus lifting the vehicle on the stand. By operating the controls at the end of the handle, the operator can cause the power unit to disengage from the stand, and the stand will remain locked in its extended supporting position under the vehicle.

After the stand is raised and locked in place supporting the vehicle, or other load, in an elevated position, the power unit lift arms are lowered and the power unit is disengaged from the stand and pulled away, leaving the stand in position supporting the load. Another jack stand, carried within the chassis, is automatically transferred to the forward end the chassis for placement at another desired location of the vehicle or for use in lifting and supporting another vehicle.

To lower the vehicle and remove the stand, the power unit is maneuvered to re-engage with the stand. The engagement causes any existing jack stands carried within the chassis to be automatically transferred rearward within the chassis. By manually operating a control at the end of the handle, the operator can cause the power unit to re-engage with the stand, and to disengage the ratchet locking mechanism of the stand, and to lower the stand to its original position. The power unit remains engaged with the stand and can be pulled away from the vehicle with the stand carried within the chassis.

The original commercial power units were adapted to carry up to four jack stands within the chassis. Additional jack stands could be acquired and arranged at various stations on the garage floor to reload the power unit, so that a single power unit could be utilized to efficiently place and actuate numerous jack stands. It was found that many commercial users would utilize all of their available jack stands, and the power unit was thereafter useless until another jack stand was available to be extracted and reused. The present inventor developed a slide forward bridge that adapted the power unit to function as a load-lifting jack to more fully utilize the power unit. This invention is illustrated in U.S. Pat. No. 6,779,780 entitled Lift Bridge For Use With a Power Unit and a Load Lifting Jack, along with several other patents related to additional features of the lifting system.

Most of the prior art lifting devices, including those of the present inventor, were very rugged "commercial quality" products involving many castings and machined parts that require welding for fabrication and assembly and were very expensive to produce and market. The present inventor then developed and patented the innovative jack systems in a low cost "consumer quality" configuration that involved minimal welding and machining during fabrication and assembly. These inventions are illustrated in U.S. Pat. No. 6,565,068 entitled Economical Lifting device-Power Unit; U.S. Pat. No. 6,601,827 entitled Economical Lifting Device-Trunk Jack; and U.S. Pat. No. 6,691,983 entitled Economical Lifting Device-Jack Stand.

In the process of fully developing these consumer lifting devices, several design challenges were discovered that led to more improved, innovative components and assembles of the present invention, and more robust designs and manufacturing processes, resulting in improved performance and extended life for the user.

One such design challenge was that the original lift arms of the power unit had an extruded cylindrical recessed channel in the upper surface for retaining a compression spring for advancing the bridge. The design of the lift arm was very difficult to manufacture, had a high scrap rate and was not robust to produce. The assembly of the compression spring into the recessed channel was also difficult, and the assembly was not reliable and could sometimes malfunction.

Another such design challenge was that the original configuration of the slide-forward bridge had complex recessed channels, was difficult to produce, and was difficult to assemble with the compression spring onto the lift arms. The bridge could sometimes interfere with the jack stand or leveling pads, and was not as smooth in operation as desired.

Another such design challenge was that the two-stage jack stand was somewhat limited in range of elevation, and that a three-stage jack stand would be more compact and yet have increased elevation, and would be very desirable.

In view of the foregoing design challenges and desirable features of a two part lift and supporting system, it is an object of the present inventions to provide a consumer power unit having components that are robust to manufacture and assemble.

It is another object to provide an automatic-slide-forward-bridge assembly having components that are robust to produce and assemble, and that are reliable and durable in use.

It is another object to provide a three-stage jack stand having components that are robust to manufacture and assemble, that has extended elevation, and is reliable and durable in use.

It is another object to provide a trunk jack having components that are robust to manufacture and assemble.

SUMMARY OF THE INVENTION

The foregoing object to provide a consumer power unit having components that are robust to produce to manufacture and assemble are accomplished by a Robust Consumer Lifting Device-Power Unit of the present invention. The power unit comprises a rectangular frame base having a left shoe, a right shoe, a forward end having a horizontal forward support plate for receiving a jack stand, and a rearward end having a vertical rear plate with a central aperture for receiving an actuator shaft. The left shoe and right shoe each have a longitudinal track on their inner side.

The power unit includes a screw-threaded actuator shaft having a distal portion, and a proximal end extending through the aperture of the rear plate with the proximal end rotatably retained within the aperture and for further use with an external handle to facilitate rotation. The actuator shaft functions with a lateral screw axel having a central threaded aperture therein for receiving the distal end of the threaded actuator shaft. The lateral axel has guide caps extending from the ends thereof into the respective left and right longitudinal track of the shoes, whereby the lateral axel is slidably retained within the longitudinal tracks.

The lifting mechanism of the power unit includes a pair of lift arms, acting in parallel, each having a forward end and a rearward end, with the rearward end pivotally attached to the lateral axel adjacent the respective guide cap. A pair of connecting arms, acting in parallel, each have a forward end pivotally attached near the forward end of the respective left shoe and right shoe of the frame base, and have a rearward end pivotally attached at a pivot point on the lift arm. A pair of leveling pads, acting in parallel, is pivotally attached to the forward end of the respective lift arm. Each leveling pad comprises a rectangular plate oriented vertically having a forward edge, a rearward edge, and an upper surface with a flange extending outward therefrom, and having a lever arm extending downward and forward from the forward edge of the plate with each lever arm having a forward end thereof. A pairs of connecting links, acting in parallel, each have one end pivotally connected to the forward end of the respective lever arm, and have one end pivotally connected to a point on the respective connecting arm so that each leveling pad provides a substantially horizontal lifting platform at the forward ends of the respective lift arm during any elevation of the power unit.

The power unit is for use to elevate an extendable jack stand. A lift bridge is adapted to be positioned on the leveling pads of the forward ends of the lift arms, whereby said power unit is operable directly as a load lifting jack; and the lift bridge is further adapted to be displaced to a rearward position on the lift arms, whereby the power unit is again operable for use with the jack stand. The lift bridge comprises a rectangular plate having an upper rectangular surface, a bottom surface, a forward end and a pair of sides, with each side having an inner channel for engaging the outward flange of the respective leveling pad.

The bridge is preferably an automatic slide-forward-bridge including means for biasing the bridge into the forward position on the lift arms. A suitable biasing means is provided by one or more compression springs supported on (or alternatively, within) a pair of telescopic supports having a forward end pivotally attached to the lift bridge, and having a rearward end pivotally attached to the upper rearward end of the lift arm.

A more detailed example of a biasing means comprises a pair of tubular bushing guides having forward ends pivotally attached with a lateral pivot pin to the bottom rear of the lift bridge, and having rearward ends extending longitudinally and parallel between the lift arms. A lateral support axel is attached between the upper rearward ends of the lift arms, and further includes a pair of guide pins having rearward ends attached to the lateral support axel and having the forward ends inserted within the rearward ends of the tubular bushing guides, and telescopically extendable and retractable. A pair of compression springs is each positioned on and between the rearward end of the respective guide pin and the forward end of the respective tubular bushing guide, thereby biasing the bridge into the forward position, and compressible so that the bridge can be pushed rearward on the upper surface of the lift arms.

BRIEF DESCRIPTION OF THE DRAWINGS

While the novel features of the invention are set forth in the appended claims, the invention will be better understood along with other features thereof from the following detailed description taken in conjunction with the drawings, in which:

DETAILED DESCRIPTION OF THE INVENTION

The design and manufacturing concepts were based upon reducing the need for intricate, complex engagements that produce drag and friction by the components, and thus reducing the requirement for close tolerances on most of the various pivoting and sliding connections of the components. The components are also fabricated from strong, rugged materials that are precisely retained in fixtures during any punching and welding processes to retain the designed configuration for a very high-yield and robust fabrication. The connecting apertures and shoulders are precisely located but are large with generous tolerances relative to the pivot pins, and are thus readily align able, and are assembled with large diameter, large headed rivets and washers for efficient robust assembly of the products. The interactive mechanisms are visible and easy to inspect, and easy to clean and maintain. The products are very functional and durable during normal use and abuse, resulting in a long and robust life of the product for the consumer.

Consumer Power Unit

Figure 1:
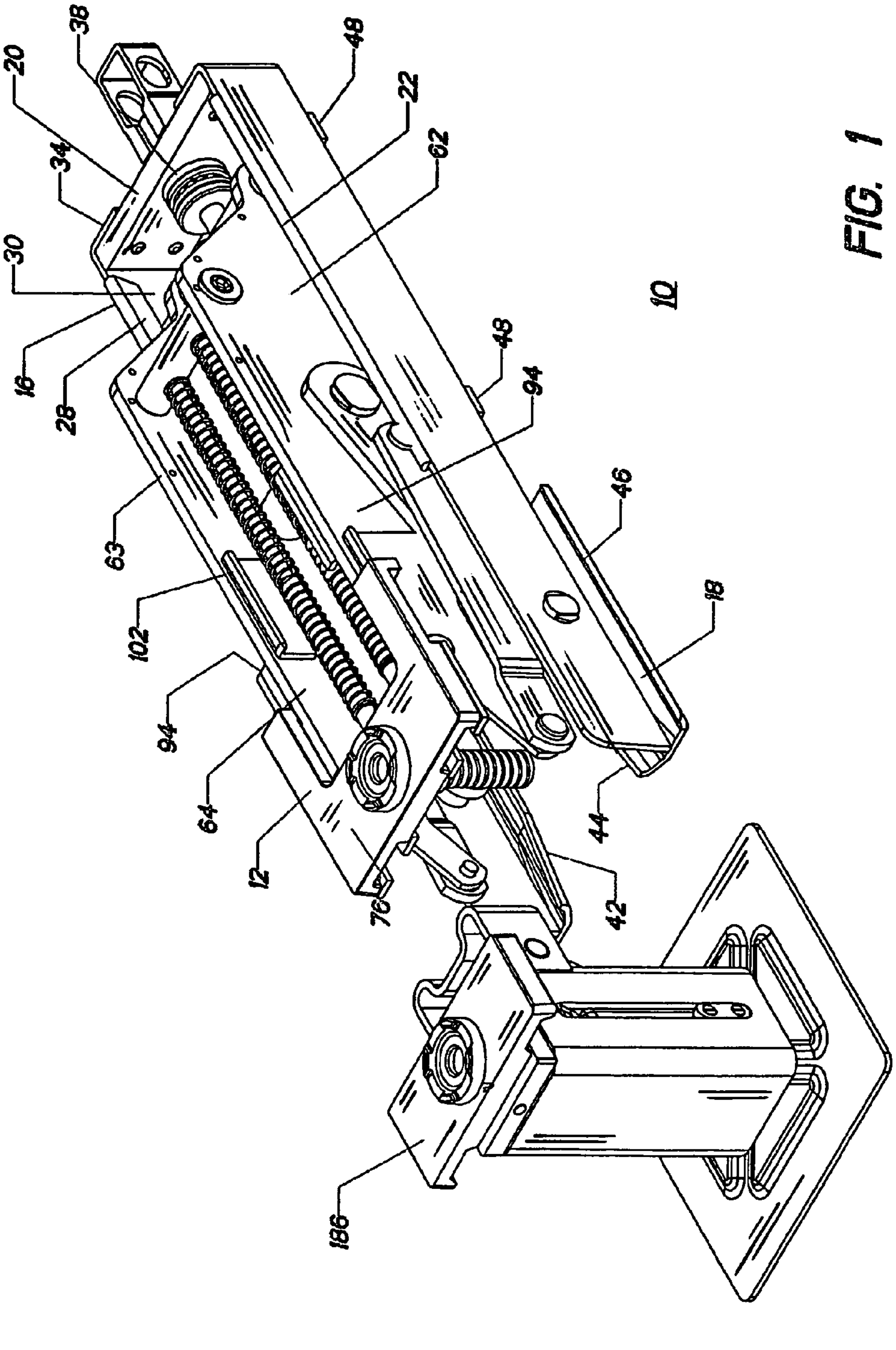
FIG. 1 is top-rear perspective view of a robust consumer power unit staged in position to engage a three-stage jack stand of the present invention.
Figure 2:
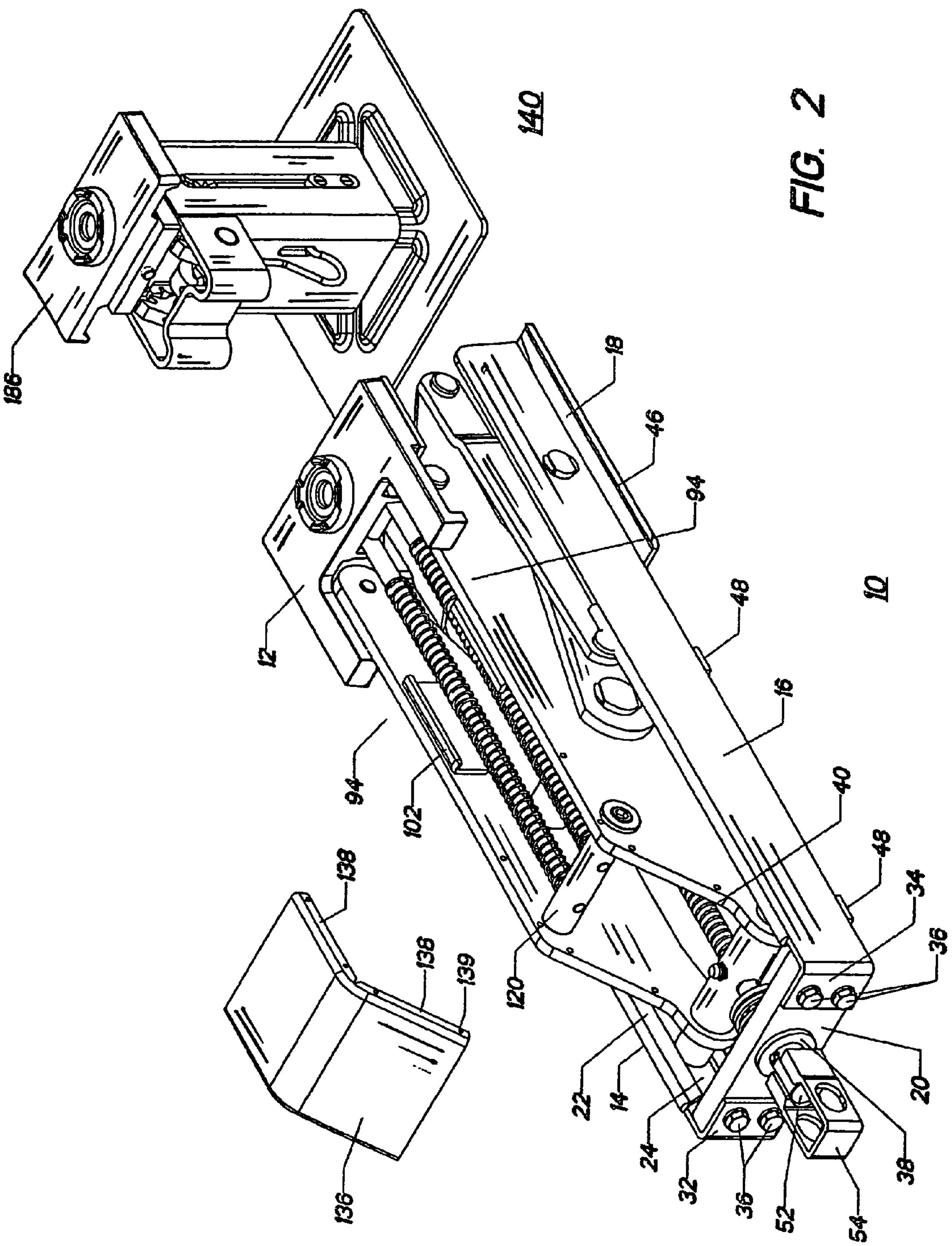
FIG. 2 is top-front perspective view of the power unit and the three-stage jack stand of FIG. 1.

Referring to FIG. 1, there is illustrated a rear perspective view of an example of a unique consumer power unit 10, adjusted to its lowest elevation, about 4.50 inches (114 mm), and staged to engage a three-stage jack stand 140. Referring to FIG. 2, the power unit and jack stand of FIG. 1 are shown also from the front side to further illustrate and describe the configuration and function of the components. An important feature of the present invention is an improved automatic slide-forward bridge 12, illustrated in FIGS. 1 and 2 in its automatic forward position, which enables the power unit and bridge to function as a stand alone, load lifting device. (The term "bridge" was first adapted in reference to a device, "bridging-the-gap" between the open forward ends of the lift arms of the power unit.)

Figure 3:
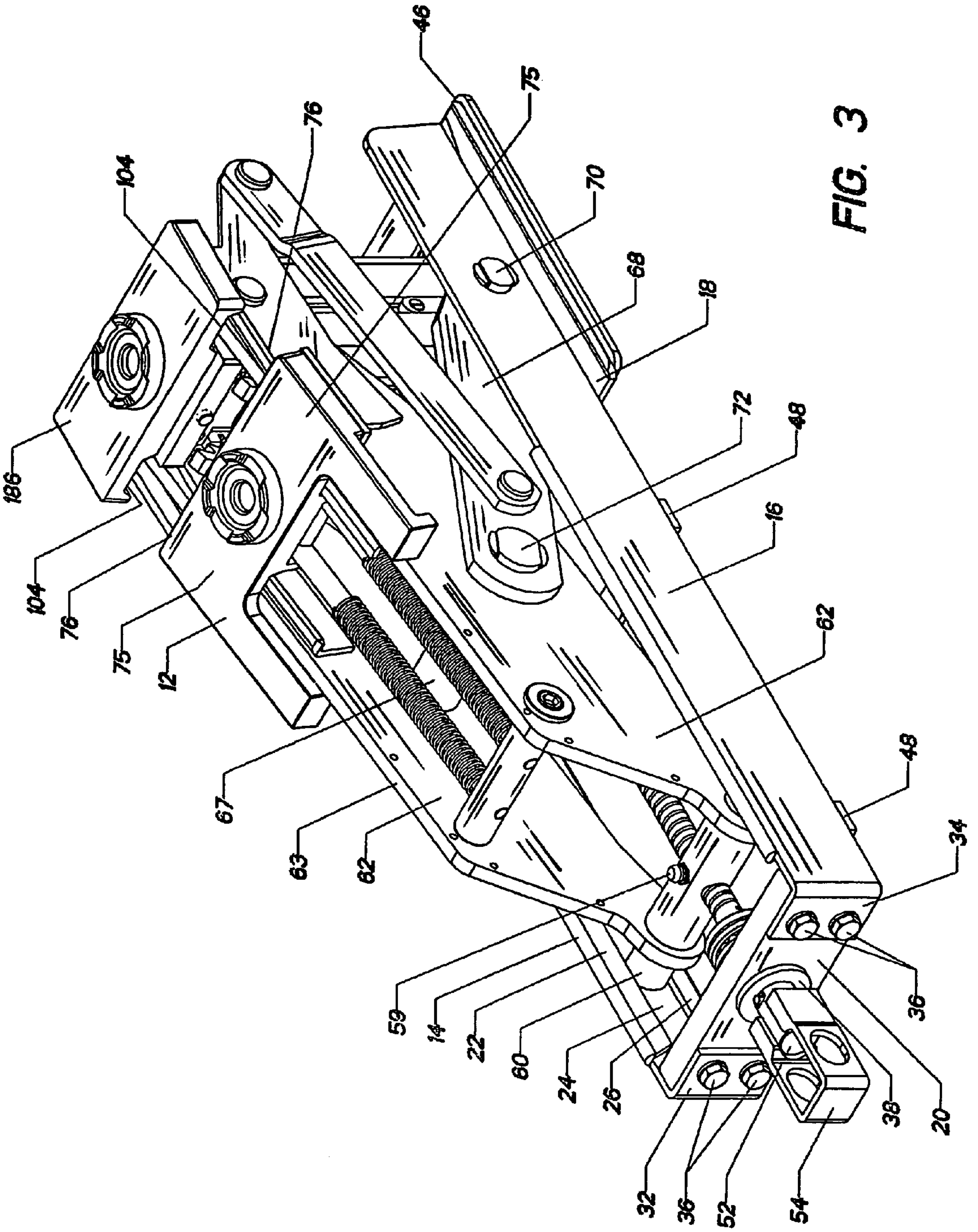
FIG. 3 is top-front perspective view of the power unit engaged with the three-stage jack stand of FIG. 1., with the slide forward bridge pushed rearward, and the lift arms of the power unit engaged with the lift collar of the jack stand.

In FIG. 3, the power unit is fully engaged with a lift collar 186 of the three-stage jack stand 140 of FIG. 2, with the slide forward bridge 12 pushed rearward by the jack stand, and the power unit functions to elevate the jack stand, and will be discussed later in detail. FIG. 3 further illustrates the configuration and function of the components of the power unit. For clarification, any reference to "left side" and "right side" will be as shown in FIGS. 2 and 3 (referenced from looking at the rear handle of the power unit).

Referring to FIGS. 1-3, the power unit 10 includes a rectangular frame base, formed by a left shoe 14, a parallel right shoe 16, separated by a horizontal forward support plate 18, and a vertical rear plate 20. The frame base is suitably about 19 inches (485 mm) in length, about 5 inches (127 mm)in width, and with the left shoe, right shoe and rear plate about 1.57 inches (40 mm) in height. The left shoe is fabricated from about 0.125 inch (3.2 mm) steel and has an upper flange 22 that is folded-over inwardly forming a double thickness of material and provides an upper edge of a left inner longitudinal track 24. A guide plate 26, fabricated from about 0.125 inch (3.2 mm) steel about 8.5 inches (215 mm) in length and about 0.31 inches (8 mm) tall, is welded vertically along the bottom inner side of the left shoe to provide the lower edge of the left inner longitudinal track. The resulting inner longitudinal track is about 0.125 inches (3.2 mm) deep, about 0.71 inches (18 mm) tall and about 8.5 (215 mm) inches long, extending along the rear portion of the left shoe. The right shoe is similarly fabricated and has an upper flange 28 and a guide plate (not visible) providing a right inner longitudinal track 30 within the right shoe.

The rear of the frame base includes the vertical rear plate 20 fabricated from about 0.50 inch (13 mm) steel plate. The rear ends of the left shoe 14 and right shoe 16 have respective inward flanges 32 and 34 with clearance apertures therein corresponding to threaded apertures in the rear plate. The rear plate is attached between the rear ends of the left shoe and right shoe with four suitable bolts 36 secured through the rear flanges of the shoes into the rear plate. The rear plate further includes a central aperture-axial bearing 38 for receiving a screw threaded actuator shaft 40 for raising and lowering the power unit.

The front end of the frame base includes the horizontal forward support plate 18, about 6 inches by 6 inches (152 mm) and fabricated from about 0.125 inch (3.2 mm) steel, welded under the forward ends of the left and right shoes. The support plate has a "U" shaped front opening 42 (see FIG. 1) for receiving the jack stand 140. The "U" shaped opening gradually expands wider to the forward end, and further includes a peripheral upward lip 44 for engaging the base of the jack stand, and for proving additional strength around the opening. The sides of the forward support plate also include an upward lip 46 for providing strength and rigidity to the plate and facilitating movement and positioning of the frame base of the power unit.

The frame base further includes reinforcing bars 48 fabricated from about 0.125 inch (3.2 mm) steel, about 0.75 inch (19 mm) wide, and welded laterally (about 119 mm in length) under the left and right shoes near the center and the rear of the shoes. The reinforcing bars add strength and rigidity to the frame, and tend to level the frame, having the same thickness as the support plate 18 that is welded under the forward ends of the shoes.

Figure 4:
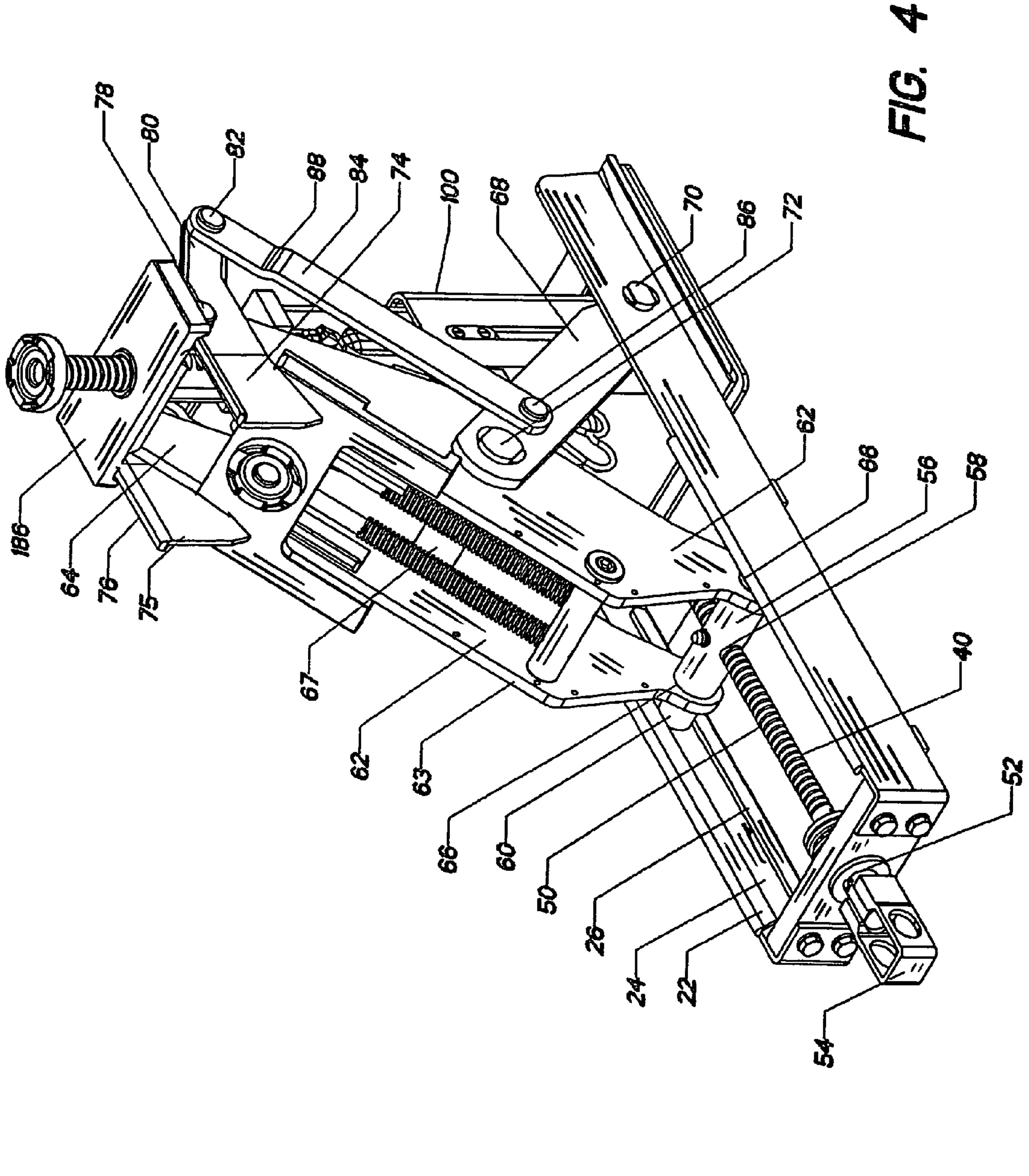
FIG. 4 is top-front perspective view of the power unit engaged with the three-stage jack stand of FIG. 2., and raised to the highest elevation position.

Referring also to FIG. 4, the power unit is operated by rotation of the actuator shaft 40 having a distal portion 50 and a proximal end 52 extending through the aperture-axle bearing 38 in the rear plate 20. A suitable actuator shaft is about 8 inches (200 mm) long, with a diameter of about 0.50 inches (12.7 mm) having machine threads formed along the distal portion of the shaft. The proximal end has a smooth larger diameter and is rotatably retained within the aperture-axial bearing; and includes an external handle adapter 54 that is further engagable by an external handle to facilitate rotation of the actuator shaft.

The lifting mechanism of the power unit is actuated by the engagement of the threaded distal portion 50 of the actuator shaft 42, within a lateral screw axle 56. The lateral screw axel has a central threaded aperture 58 therein for receiving the threads of the distal portion of the actuator shaft. The lateral screw axel further includes an optional grease fitting 59 for lubricating the engagement of the threaded aperture and the actuator shaft (see FIG.3). The lateral screw axle has guide caps 60 in each end thereof, which traverse (upon rotation of the threaded actuator shaft within the threaded aperture of the axel) along the inner longitudinal tracks 24, 30 in the left and right shoes 12, 14. The lateral screw axel is thereby retained within and traversable along the inner longitudinal tracks.

The lifting mechanism includes a pair of lift arms 62, acting in parallel, and each having an upper surface 63, a forward end 64 and a rearward end 66, with the rearward end having an aperture therein and is pivotally attached on the ends of the lateral screw axel 56 adjacent the guide caps 60. The lift arms are suitably formed from 0.25 inch steel (6.4 mm) and are about 11.8 inches (300 mm) in length and have an average width of about 2.00 inches (50 mm). The lift arms are interconnected (near their centers) by a lift arm pivot axel 67 extending laterally between the lift arms and attached through apertures therein at a pivot point 72. (The pivot point 72 is at a distance from the rearward end of the lift arm that is about equal to the length of a connecting arm 68 as discussed below).

The lift arms 62 function with a pair of connecting arms 68, acting in parallel, each having a forward end with apertures therein pivotally attached at pivot point 70 near the forward end of the respective left shoe and right shoe of the frame base. The rearward ends of the connecting arms are pivotally attached through apertures therein at the pivot point 72 on the lift arms by suitable washers, bushings and screws into the ends of the pivot axel 67. The pivot point 72 is at a distance from the rearward end of the lift arm that is about equal to the length of the connecting arm. The connecting arms are suitably formed from 0.250 inch (6.3 mm) steel about 1.50 inches (38 mm) wide and about 7.28 inches (185 mm) in length, having about 5.1 inches (150 mm) between the pivot points.

As the lateral screw axel 56 is (and rearward ends 66 of the lift arms 62 are) advanced by the actuator shaft 42, the rearward ends of the connecting arms are rotated upward, and the lift arms are rotated about the pivot point 72 at the rearward ends of the connecting arms, to elevate the forward ends 64 of the lift arms vertically above the forward support plate 18 of the frame base. (As shown in FIG. 4, the dimensions and pivot points of this example of the invention, provides the power unit to extend to an elevation of about 14 inches (356 mm.)

The lift arms 62 further include a pair of leveling pads 74 acting in parallel and adapted to provide a level lifting platform on the forward end of the each lift arm. Each leveling pad is suitably fabricated from 0.125 inch (3.2 mm) steel forming a generally rectangular plate oriented vertically, about 3.75 inches (95 mm) in length and about 1.58 inches (40 mm) in height, having a rear edge 75 and having a flange 76 extending outward about 0.20 inches (5 mm) wide along the upper edge forming the lifting platform of the pad. Each pad is pivotally attached to the forward ends of the respective lift arm at a pivot point 78 through an aperture located about 1.00 inch (25 mm) from the forward edge and about 0.60 inches (15 mm) from the upper flange. Each pad further includes a lever arm 80 extending downward and forward from the forward edge of the plate at an angle of about 28 degrees, to a pivot point 82, about 2.52 inches (64 mm) from the pivot point 78, near the end of the lever arm.

The leveling pads 74 are maintained in the generally horizontal position at any angle and elevation of the left arms, by a pairs of connecting links 84. Each connecting link has one end pivotally connected to the common pivot point 82 at the forward end of the lever arm 80, and has the other end pivotally connected to a pivot point 86 on the connecting arm 68, so that the leveling pad remains substantially horizontal at all positions of the lift arms. Each connecting link is suitably fabricated from about 0.188 inch (4.8 mm) steel, about 0.88 inches (22.4 mm) wide and about 7.88 inches (200 mm) in length, having about 7.09 inches (180 mm) between pivot points 82 and 86. The pivot point 86 is suitably located about 1.28 inches (32.5 mm) forward of the pivot point 72 on each connecting arm. Each connecting link further includes an inward parallel jog 88 (about 0.12 inches or 3 mm) to provide clearance behind the forward end of the connecting arm, and to align the connecting link for connection with the lever arm of the leveling pad. The leveling pads provide a lifting platform for the lift arms to engage the lift collar 186 to elevate the jack stand 140; and when there is no jack stand on the forward support, the leveling pads engage the slide-forward-bridge 12 to elevate the bridge to function directly as a load lifting jack.

Automatic-Slide-Forward-Bridge

Figure 5:
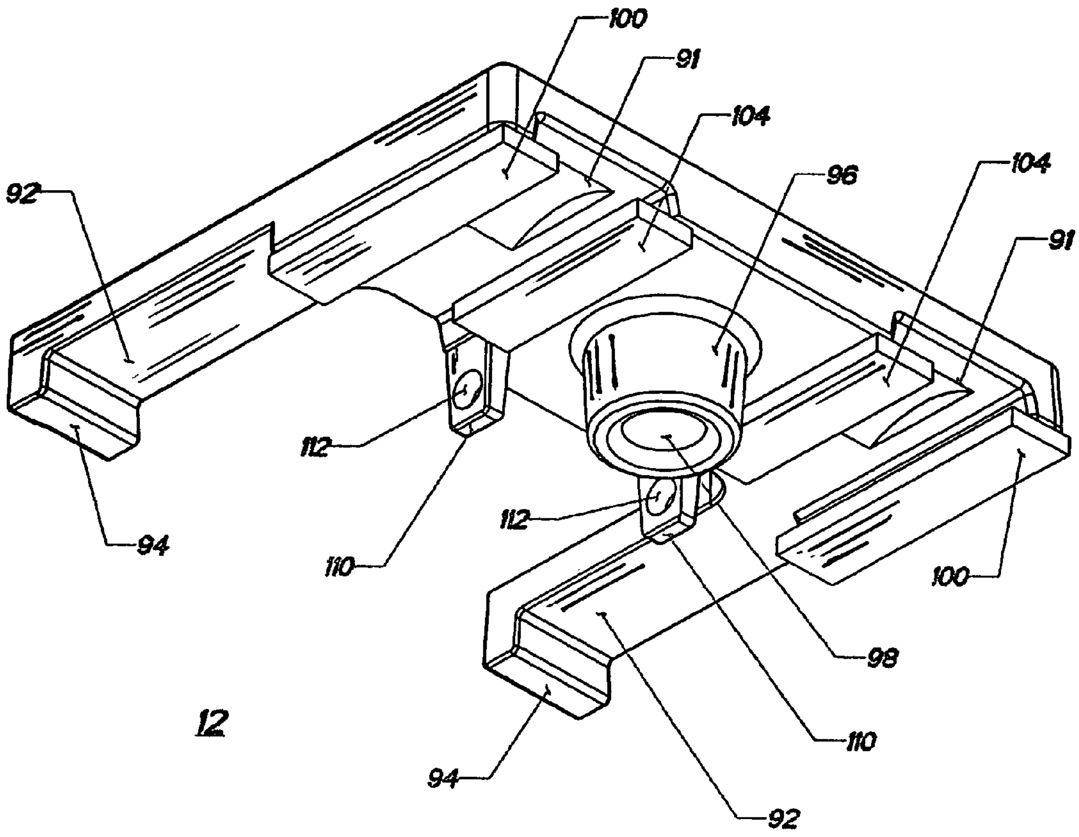
FIG. 5 is a detailed view of the slide forward bridge of the present invention.
Figure 6:
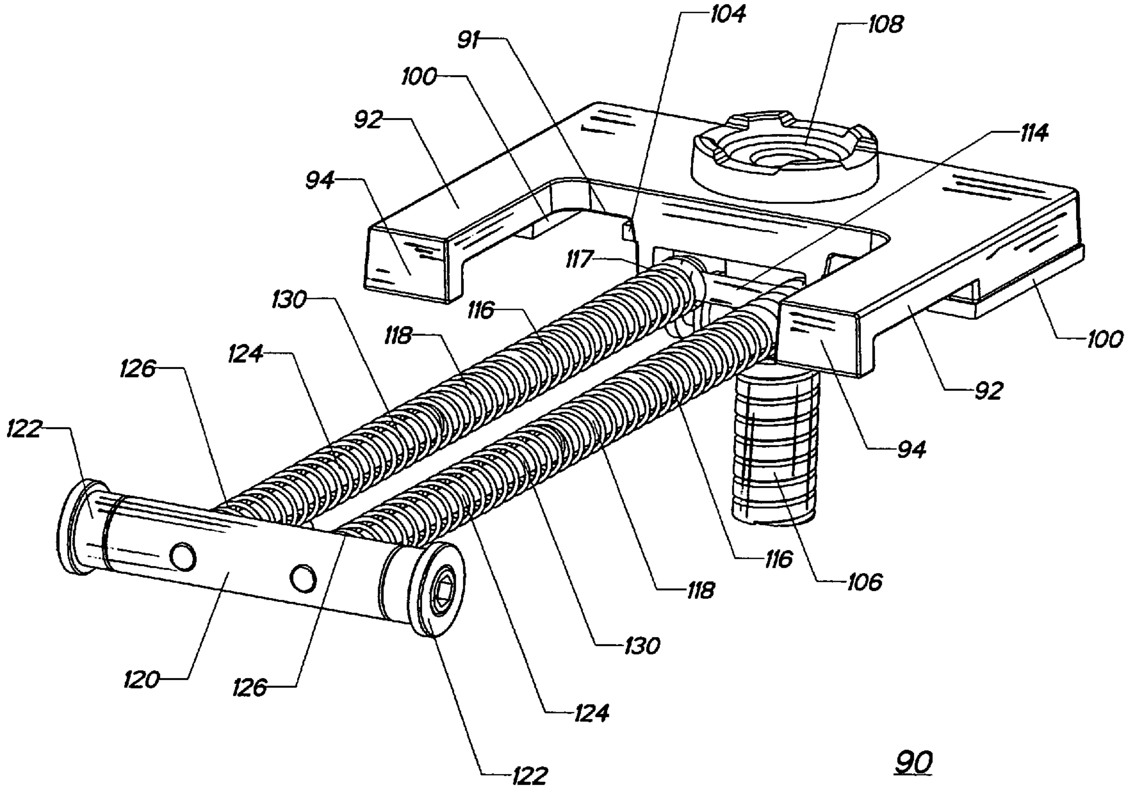
FIG. 6 is a top-front perspective top of the slide forward bridge and automatic spring assembly of the present invention.

Referring also to FIGS. 5 and 6, the slide-forward-bridge 12, and an automatic-slide-forward-bridge assembly 90 are respectively illustrated in detail. As previously discussed, the lift bridge 12 is adapted to be automatically positioned on the forward ends of the lift arms, whereby the power unit is operable as a load lifting jack; and the bridge is further adapted to be displaced from the forward ends of the lift arms, whereby the power unit is operable for use with the jack stand.

The bridge 12 is fabricated from a steel casting comprising a generally rectangular (horizontally oriented) plate, about 4.45 inches (113 mm) wide and about 1.90 inches (48 mm) long with wall thickness of about 0.28 inches (7 mm), having a generally flat upper surface. Each side of the casting further includes a longitudinal inner channel 91 (about 1.0 inch, or 25 mm wide) in the bottom thereof for engaging the outward flange 76 on each leveling pad 74; and further includes a finger 92 about 0.71 inches (18 mm) wide extending from the upper surface of the plate (and above the outer portion of each channel) and rearward about 2.00 inches (52 mm) behind the channel, with each finger having a downward end flange 94 for abutting the rearward edge 75 of each leveling pad. The casting further includes a cylindrical boss 96, extending downward from the center of the plate about 1.00 inch (28 mm), and having a diameter of about 1.00 inch (28 mm) with a central vertical aperture 98 therein that is machined with screw threads (about 0.93 inch, or 24 mm in diameter).

The bridge 12 further includes an inner securing plate 100 soldered along the lower outer edge of each channel providing an inward flange for further engaging the outward flange of the respective leveling arm. See also FIGS. 3 and 4, where each lift arm 62 further includes a bridge guide 102 (suitably provided by a bracket with an inward flange) extending longitudinally along the upper surface 63 of the lift arm, at the location of the rearward position for the lift bridge. The bridge further includes an outer securing plate 104 soldered along the lower inner edge of each channel, for engaging the bridge guide 102 of the lift arm when the lift bridge is displaced to the rearward position.

The central threaded aperture 98 is provided for receiving a shaft 106 of a screw-out saddle 108. The screw-out saddle is typically screwed down when the power unit is used to elevate a jack stand; but can be screwed out (about 4.00 inches or 100 mm) to reduce the initial distance between the bridge and the object to be lifted, when the power unit is utilized (with the bridge) as a stand alone jack.

The casting further includes two flanges 110, about 0.31 inches (8 mm) long and extend downward about 1.00 inch (25 mm) near the rear edge of the plate. The flanges 110 are centered about 1.42 inches (36 mm) apart, and are machined with apertures 112 to receive a lateral pivot pin 114. The lateral pivot pin supports a pair of tubular bushing guides 116 having forward ends 117 pivotally attached to the pivot pin and having rearward ends 118 extending longitudinally and parallel between the lift arms. Each tubular bushing guide is suitably fabricated from tubular galvanized steel having an outer diameter of about 0.394 inches (10 mm), an inner diameter of about 0.28 inches (7.1 mm) and a length of about 4.65 inches (118 mm).

A lateral support axel 120 is attached between the lift arms near the upper edge at 122 with a suitable bushing and screw in each side. The lateral axel supports a pair of longitudinal guide pins 124 having rearward ends 126 attached to the lateral support axel and having forward ends 128 extending parallel, and inserted within the rearward ends of the tubular bushing guides, and are telescopically extendable and retractable within the tubular bushings. Each guide pin has a suitable diameter of about 0.25 inches (6.3 mm) and a length of about 4.75 inches (120 mm).

Prior to final assembly of the guide pins 124 and the bushing guides 116, a pair of compression springs 130 are each positioned on and between the rearward end 126 of the respective guide pin and the forward end 118 of the respective tubular bushing guide. A suitable compression spring has a wire diameter of about 0.04 inches (1 mm), a coil diameter of about 0.50 inches (13 mm) and a free length of about 8 inches (200 mm). The compression springs and telescopic supporting guides sufficiently bias the bridge 12 into the forward position on the leveling pads, and yet are easily compressible so that the bridge can be readily pushed rearward on the upper surface of the lift arms.

Figure 6A:
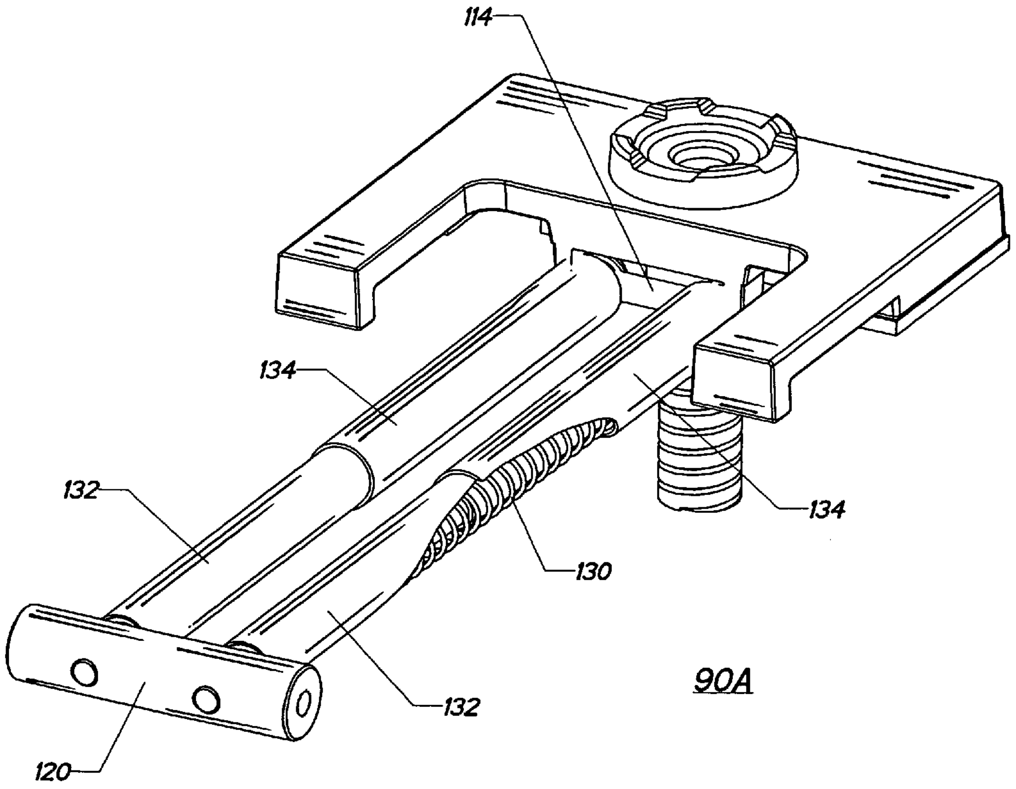
FIG. 6A is a top-front perspective top of the slide forward bridge and an alternative arrangement of the automatic spring assembly of the present invention.

Referring now to FIG. 6A, an alternative forward biasing arrangement of the bridge 12 is illustrated wherein the pair of compression springs 130 are enclosed within (rather than over) a pair of telescoping tubular sleeves. A first pair of sleeves 132, suitably formed from tubular galvanized steel, having an inner diameter of about 0.625 inches (16 mm), and a length of about 4.75 inches (120 mm) are connected in parallel to the lateral support axel 120. The compression springs 130 are then inserted with the first pair of sleeves. The springs and the free ends of the first pair of sleeves are telescopically inserted into a second pair of tubular sleeves 134. The second pair of sleeves has an inner diameter of about 0.75 inches (19 mm), a length of about 4.65 inches (118 mm) and are each connected in parallel to the lateral pivot pin 114. This fully enclosed spring arrangement protects the springs from any external dirt and debris and provides a clean appearance to the automatic slide forward bridge assembly.

A further alternative forward biasing arrangement of the bridge can be provided by combining the longitudinal guide pins 124 FIG. 6, with the inter-mating one of either the first pair of sleeves 132 or the second pair of sleeves 134 of FIG. 6A. Such a further partially enclosed arrangement can provide good support and some protection of the compression springs 130.

FIGS. 1 and 2 illustrate the lift bridge assembly 90 in the biased forward position, secured laterally by the outward flanges 76 on the leveling pads, and with the finger end flanges 94 of the bridge abutting the rear edges 75 of the leveling pads. FIG. 3 illustrates the lift bridge assembly in the rearward position, compressed initially by the configuration and mass of the jack stand; and when the power unit is slightly elevated (as shown), the rear edges of the leveling pads 74 become angled and extend above the upper surface of the lift arms to further retain the bridge in the rearward position. FIG. 4 illustrates the power unit fully elevated with the bridge secured laterally on the bridge guides 102 of the lift arms, and retained in the rearward position entirely by the rear edges of the leveling pads, and there is no interference of the bridge with the jack stand. Once the power unit is removed from the jack stand and the lift arms are lowered to the level position (about 4.50 inches or 114 mm), the respective rear edges and outward flanges 76 of the leveling pads come back into alignment with the inner channels 91 of the bridge, and the bridge is automatically released and snaps back into the forward position by the compression springs.

Referring further to FIG. 2, the upper, rear portion of the lift arms' 62 can be enclosed by an optional metal cover 136 (show exploded). The cover is laterally flat and contoured to the shape of the upper surface of the lift arms. The cover further includes suitably downward flanges 138 having apertures or detents 139 for securing the cover to the lift arms. The cover provides some protection for the actuator mechanism, and provides an optional nameplate for the device.

Three-Stage Jack Stand

As introduced in reference to the description of the power unit 10, an example of the robust three-stage jack stand 140 of the present invention is shown in FIG. 2 in its lowest elevation of about 6.38 inches (162 mm); shown in FIG. 3 initially engaged with the power unit; and shown in FIG. 4 raised by the power unit to its highest elevation of about 14 inches (356 mm). The jack stand was designed for a maximum capacity of 4000 pounds (1814 kg) and weighs about 1.50 pounds (3.33 kg). The jack stand is typically operated by the power unit; however, the jack stand can be utilized separately, placed and operated by hand, to support a load that has already been elevated by a conventional jack or other means.

Figure 7:
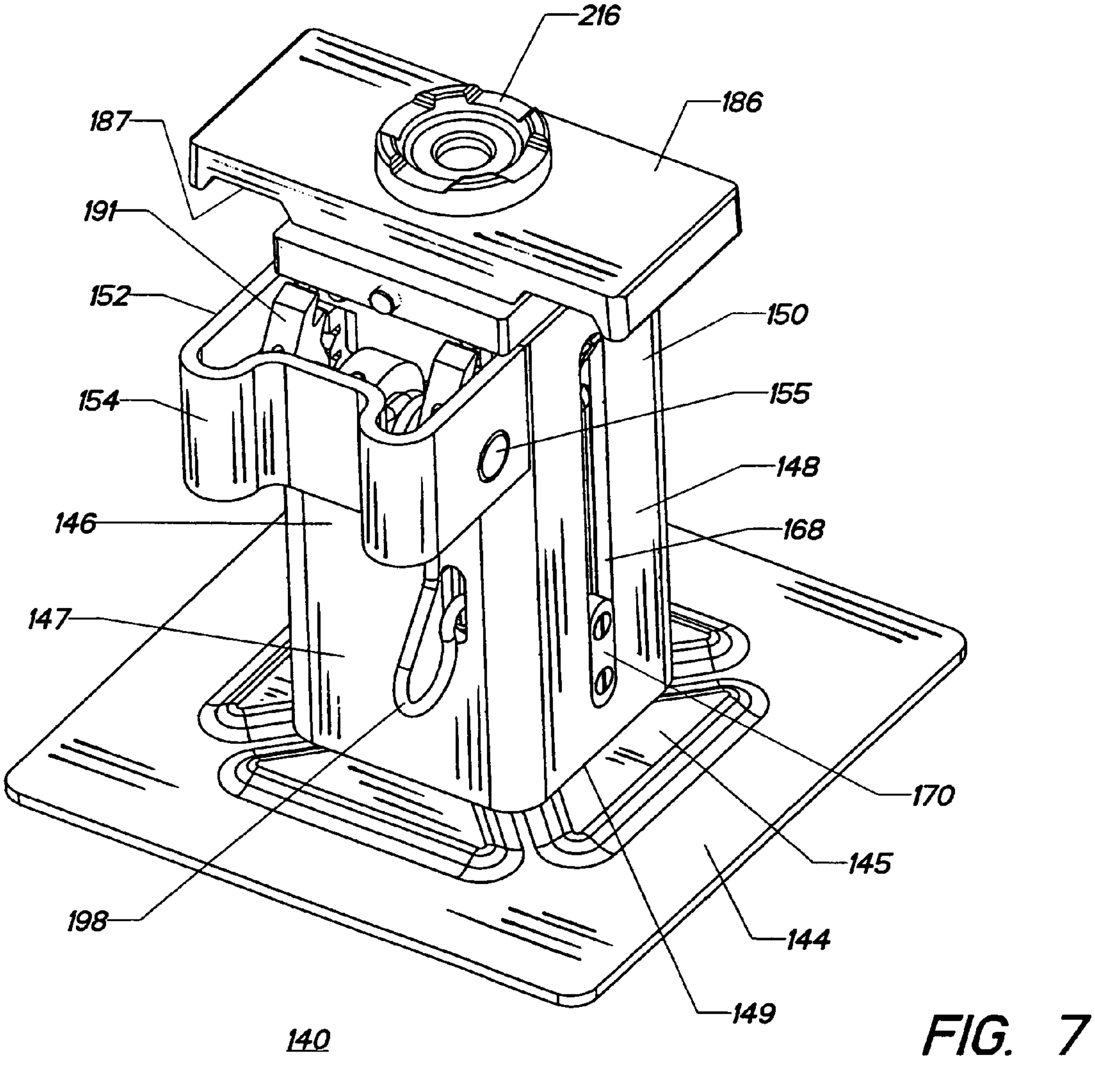
FIG. 7 is a top-front perspective view of the three-stage jack stand of the present invention in the lowest elevation position.
Figure 8:
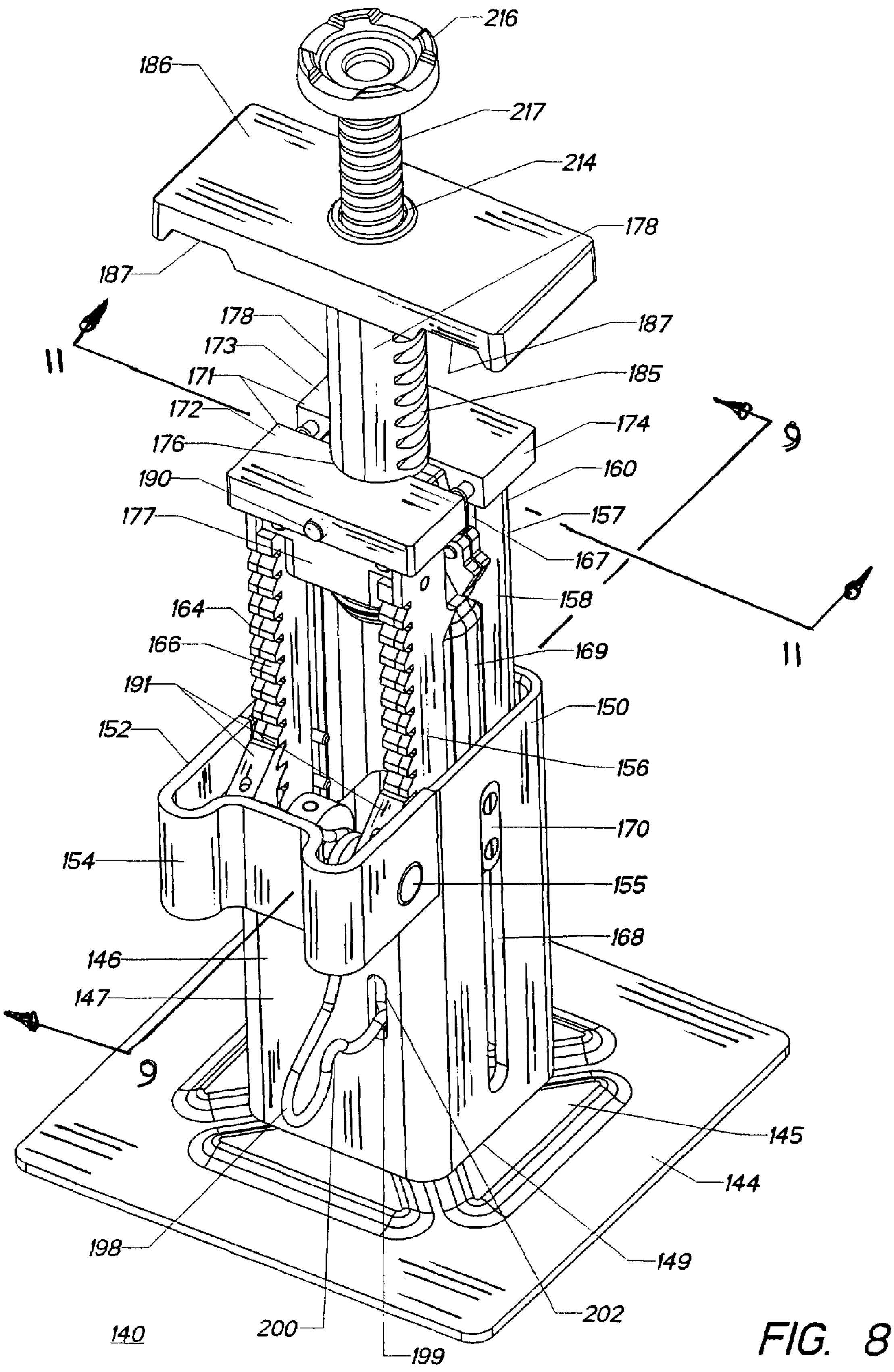
FIG. 8 is a top-front perspective view of the three-stage jack stand of the present invention in the highest elevation position.
Figure 13:
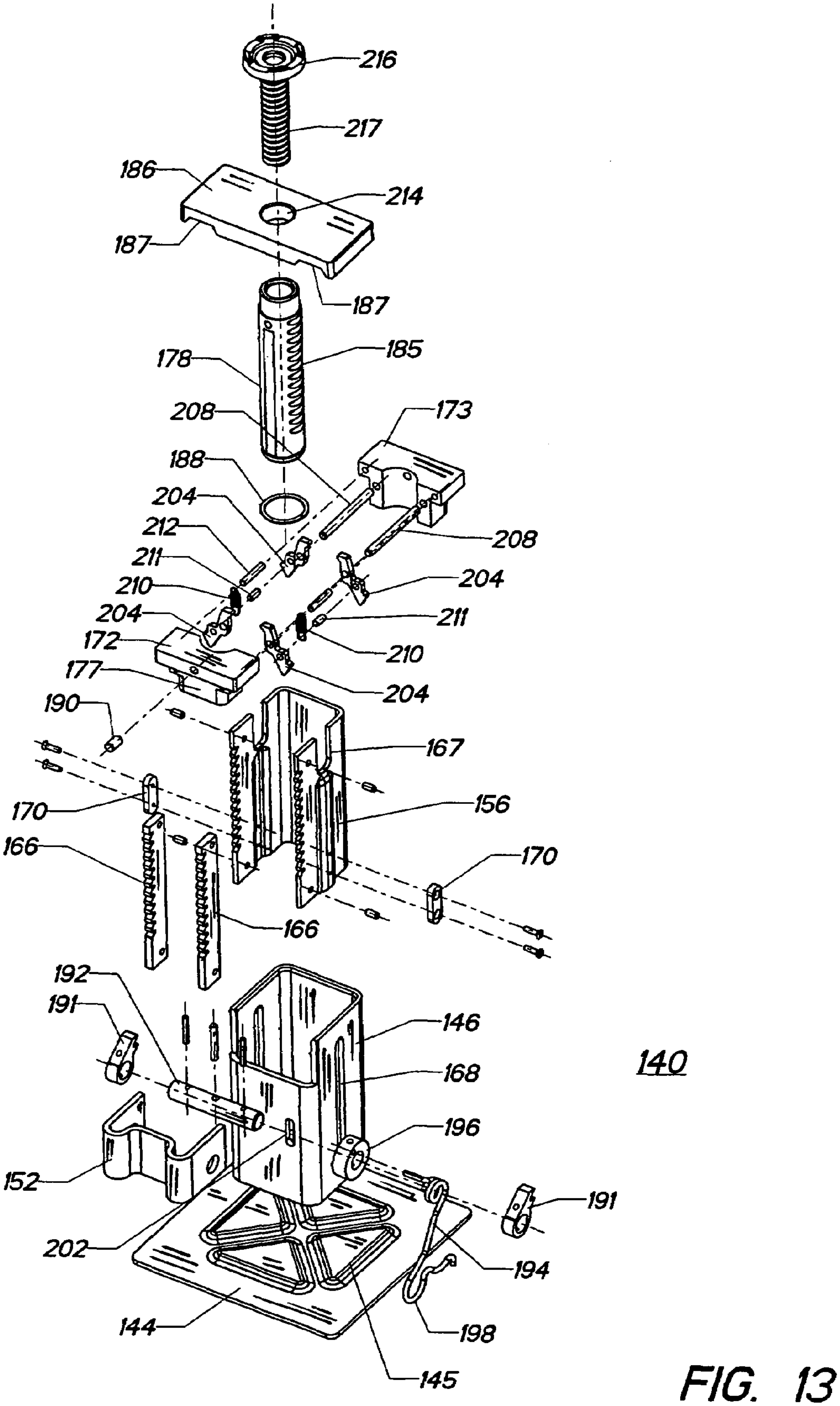
FIG. 13 is an exploded top-front perspective view illustrating the components of the three-stage jack stand of FIG. 8.

Referring to FIGS. 7, 8 and 13, the jack stand 140 is enlarged and shown respectively in its lowest elevation, in its fully extended elevation, and in a detailed exploded view to illustrate the configuration and function of its components and stages.

The foundation of the jack stand is a square base plate 144, having about 6 inches (152 mm) sides and stamped from about 0.12 inch (3 mm) steel, and having a smaller square platform 145, having about 3.97 inches (100 mm) sides, stamped into the upper surface for additional stiffness and strength.

The first stage of the jack stand refers to a square tubular housing 146 having a forward side 147, left and right sides 148; and a lower end 149 welded to the center of the base plate 144, and having an upper end 150 extending vertically from the base plate. The tubular housing is formed from about 0.14 inch (3.5 mm) steel having about 2.50 inches (64 mm) sides and extending about 5 inches (127 mm) upward from the base plate. The tubular housing includes a pawl housing 152 fabricated from about 0.14 inch (3.5 mm) steel strap that is about 1.34 inches (34 mm) tall that is welded to and extends about 1.18 inches (30 mm) straight forward from the upper ends of both sides and is enclosed along the forward side by a pair of vertical semi-cylindrical bumpers 154 that further extend forward to a distance just above the front edge of the base plate. The pawl housing includes apertures 155 in each side thereof (for supporting a lateral pivot pin of a pawl assembly to be described later in detail). The front bumpers add strength to the pawl housing and further function to push the lift bridge 12 of the power unit 10 to the rearward position on the lift arms, when the jack stand is engaged with the power unit (see FIG. 3). The housing further includes a pair of vertical slots 168 in each side for retaining and stabilizing the second stage of the jack stand as described below.

The second stage of the jack stand refers to a "U" shaped ratchet shaft 156 having a back side 157, left and right sides 158, an upper end 160 and a lower end 162, with front ratchet teeth 164 on the forward edges of the sides. The ratchet shaft is formed from 0.12 inch (3 mm) steel about 2.20 inches (56 mm) on each side, and about 4.72 inches (120 mm) tall. The ratchet shaft preferably further includes a pair of reinforcing ratchet plates 166 secured to the inner front edges of the left and right sides of the ratchet shaft, to provide a wide, rugged set of front ratchet teeth on the forward edges of the shaft. The upper ends of the left and right sides each have a central rectangular opening 167 about (15 mm) wide extending downward about 1.18 inches (30 mm); and the lower ends each have a central longitudinal ridge 169 about 0.38 inches (10 mm) wide and extending upward about 3.35 inches (85 mm) from the bottom. The ratchet shaft is inserted within the upper end 150 of the housing 146 and is telescopically extendable and retractable within the housing. A pair of guide lugs 170 are attached onto the lower end of each ridge and within the slots 168 in the housing, for retaining and stabilizing the ratchet shaft during extension and retraction of the ratchet shaft within the housing.

The second stage further includes an upper base 171, secured to the upper end of the ratchet shaft having a front half 172, a rear half 173, left and right side 174, and having a vertical central cylindrical opening 176. The upper base has a generally square lower portion 177 extending about 0.79 inches (20 mm) within the ratchet shaft, and has a horizontal generally square upper configuration extending about 0.39 inches (10 mm) above the upper end of the ratchet shaft, with about 2.36 inches (60 mm) sides providing flanges extending outward along each side. The front half and the rear half are spaced apart about 0.39 inches (10 mm) providing openings in the sides, and within the rectangular openings 167 in the sides of the ratchet shaft (for providing clearance and for supporting a dog assembly to be described later in detail).

The third stage refers to a tubular shaft 178 having an upper end 179, a lower end 180, a front side 182, left and right sides 184, and having side ratchet teeth 185 in the left and right sides of the tubular shaft. The tubular shaft suitably has an outer diameter of about 1.04 inches (26 mm), an inner diameter of about 0.73 inches (18 mm), and a length of about 4.96 inches (126 mm). The tubular shaft is inserted within the cylindrical opening 176 in the upper base 171 and is telescopically extendable and retractable within the U shaped ratchet shaft 156. The tubular shaft includes a rectangular lift collar 186 securely mounted horizontally on the upper end of the tubular shaft. The lift collar is about 4.45 inches (113 mm) wide extending beyond the sides of the housing, and about 1.90 inches (48 mm) long, and about 47 inches (12 mm) thick; and includes recessed channels 187 within the bottom sides for receiving the leveling pads 74 of the power unit 10. The lower end of the tubular shaft is confined within the upper base of the ratchet shaft by a spring retaining ring 188 (see FIGS. 11 and 13) secured within an annular recess in the lower end of the tubular shaft. The tubular shaft includes a longitudinal front channel 189 extending the length of the front side thereof; and the front half 172 of the upper base includes a (set screw type) protrusion 190 having a rounded distal tip extending into the front channel for orienting the tubular shaft within the upper base.

Figure 10:
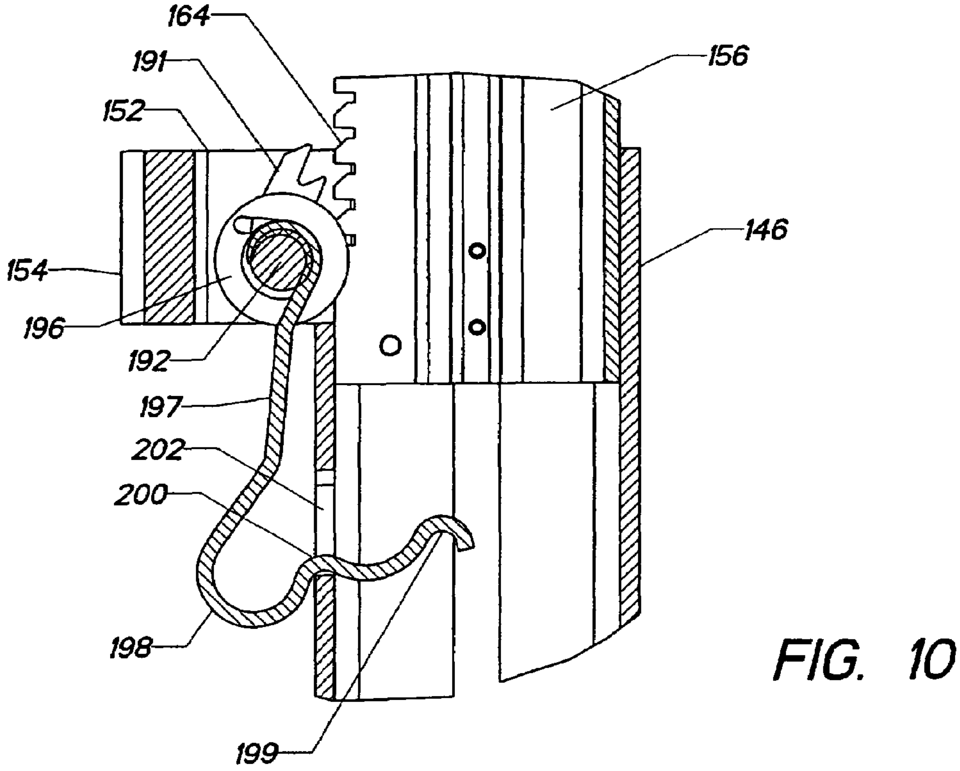
FIG. 10 is a sectional view similar to FIG. 9; illustrating the spring handle positioned so that the lower pawls are disengaged with the ratchet teeth of the shaft.
Figure 9:
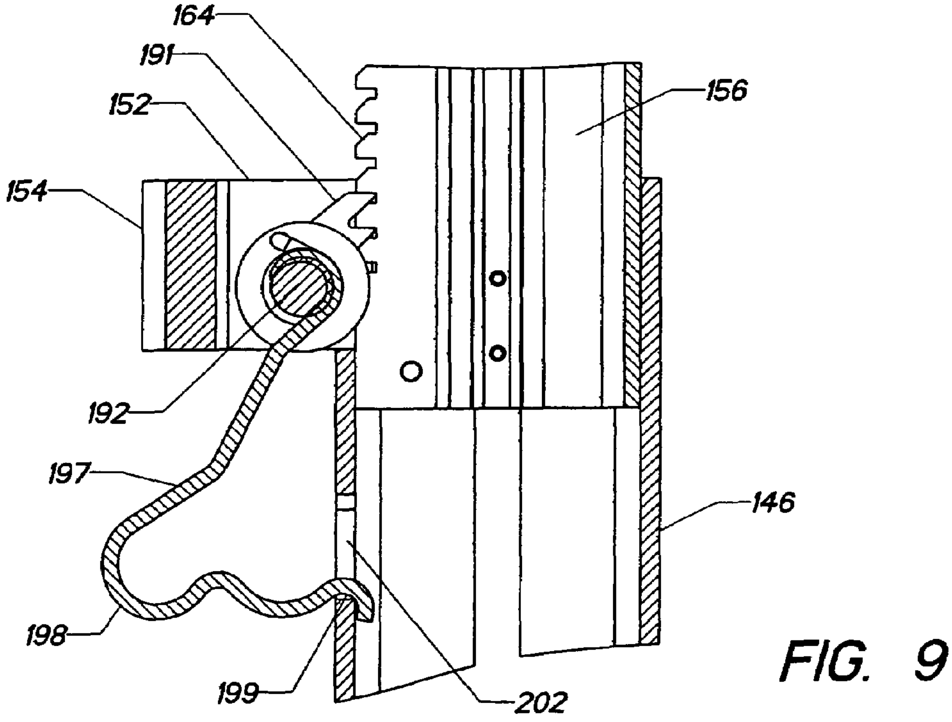
FIG. 9 is a sectional view taken along 9-9 of FIG. 8; illustrating the spring handle positioned so that the lower pawls are engaged with the ratchet teeth of the shaft.
Figure 11:
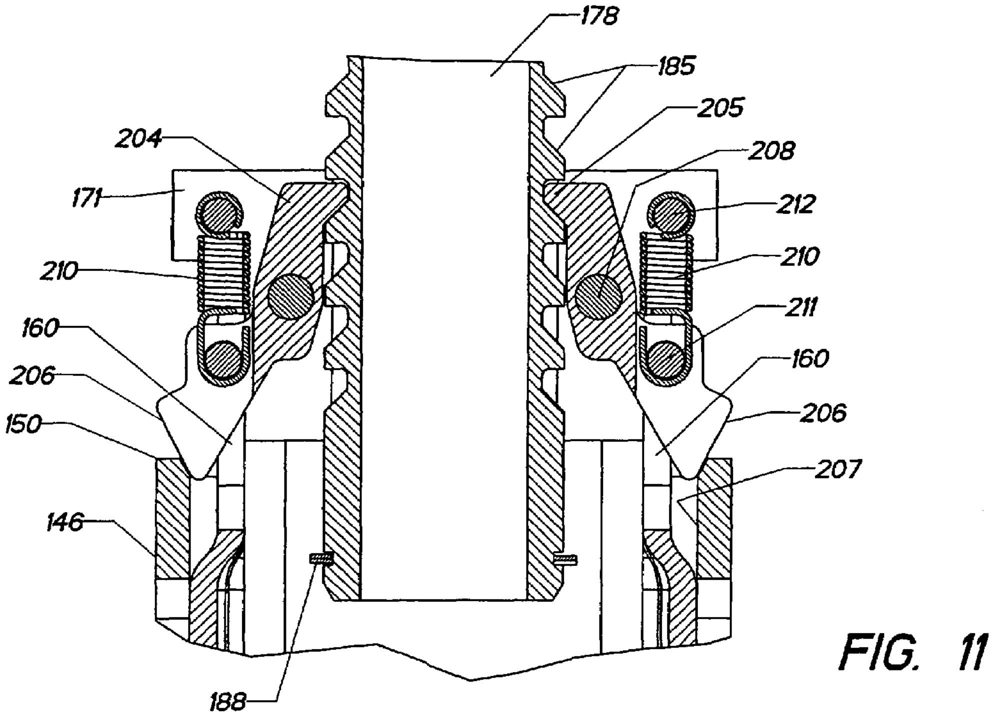
FIG. 11 is a sectional view taken along 11-11 of FIG. 8; illustrating the second stage extended upward of the housing so that the upper dogs are engaged with the ratchet teeth of the tubular shaft.

Referring also to FIGS. 9, 10 and 11, the second stage ratchet shaft 156 is retained in position within the housing 146 by a pair of pawls 191, interconnected by a lateral pin 192 pivotally attached in the apertures 155 of the pawl support 152 at the upper end of the housing. Each pawl is adapted to be engagable with respective front ratchet tooth 164 (and reinforcing plates 166) on the forward edges of the ratchet shaft. In the preferred example, each pawl is somewhat "claw" shaped having a base with a diameter of about 0.75 inch (19 mm) and further tapering about 0.35 inches (9 mm) to a curved, double-toothed distal tip (actually engagable with two forward ratchet teeth). Each pawl is suitably formed from 0.31 inch (8 mm) steel plate. The pawls are aligned on the lateral pin adjacent the front ratchet teeth and are suitably fixed on the pin with suitable fasteners (set screws or spring pins).

The pawls 191 are controlled by an actuating spring handle 194 having an upper end 195 with several spring coils wound around the lateral pin 192 and with a lateral upper tip secured to a cylindrical bushing 196 that is fixedly mounted on the lateral pin between the pawls. The cylindrical bushing is suitably formed from 0.39 inch (10 mm) steel plate having an inner diameter to fit the lateral pin, and an outer diameter of about 1.00 inch (26 mm), with a lateral aperture near the outer circumference for receiving the upper tip of the actuator spring, and having a radial apertures for securing the bushing to the lateral pin with a suitable fastener (set screws or spring pins). The actuator spring handle includes a generally vertical central portion 197 that provides the lever handle to control the rotation of the lateral pin and pawls. The lower end of the actuating spring is bent generally horizontal forming a finger-pull loop 198, and includes a first position indention 199 and a second position indention 200 at the lower end. The actuating spring is suitable formed of 0.12 inch (3 mm) diameter spring steel, (about six inches long) and contoured generally into the above described shape with the central portion 197 about 2.64 inches (67 mm) in length, and having about 0.90 inches (23 mm) between the first position indention 199 and the second position indention 200.

The actuator spring handle 194 is secured in the desired position in the forward side 147 of the tubular housing 146. The tubular housing includes a slotted opening 202 adapted to receive the lower end 198 of the actuating spring handle. The slot is off center (shown to the right), to provide clearance for the tubular shaft 178 that may be extended downward within the center of the ratchet shaft 156. The bushing 196 retaining the upper end 195 of the actuating spring is similarly positioned on the right side of the lateral pin 192 (near the right pawl 191) to vertically align the actuating spring in the slotted opening.

As shown in FIG. 9, when the handle loop 198 of the actuating spring 194 is pulled out, the first position indention 199 is engaged within the slotted opening 202 of the housing, to provide inward (clockwise) rotational torque on the pin 192, and thus the pawls 191 are each engaged with the respective front ratchet teeth 164. In typical ratchet movement, as the ratchet shaft 156 is elevated (by the power unit, lifting the lift collar), the inclined upper surface of the next ratchet tooth 164 wedges the underside of the pawl (slightly counter-clockwise) and slides upward past the pawl, and the torque of the spring engages the pawl back onto the "next" tooth, etc. However, the lower surface of the "next" tooth is flat (and indented) and can only act on the upper side of the pawl, and any downward force on the upper side of the pawl tends to lock the pawl into the base of the "next" tooth; and thus prevents any downward movement of the ratchet shaft. When the jack stand is raised to the desired height, each pawl is engaged under the adjacent "next" ratchet teeth to securely and safely support the load, and the power unit 10 can be lowered and removed.

As shown in FIG. 10, to lower the ratchet shaft 156, the handle loop 198 of the actuating spring handle is pushed inward, and the second position indention 200 is engaged within the slotted opening 202 of the housing to provide outward (counter-clockwise) rotational torque on the pin 192, and thus the pawls 191 are disengaged from the forward ratchet teeth 164. It should be noted that, if there is a downward load on the ratchet shaft, the torque of the actuating spring is insufficient to disengage the pawls, and the ratchet shaft remains locked within the housing until the load is released (by engagement of the power unit 10 and slightly raising the jack stand), then the torque of the actuating spring releases the pawls and the load and jack stand can be lowered by the power unit.

Figure 12:
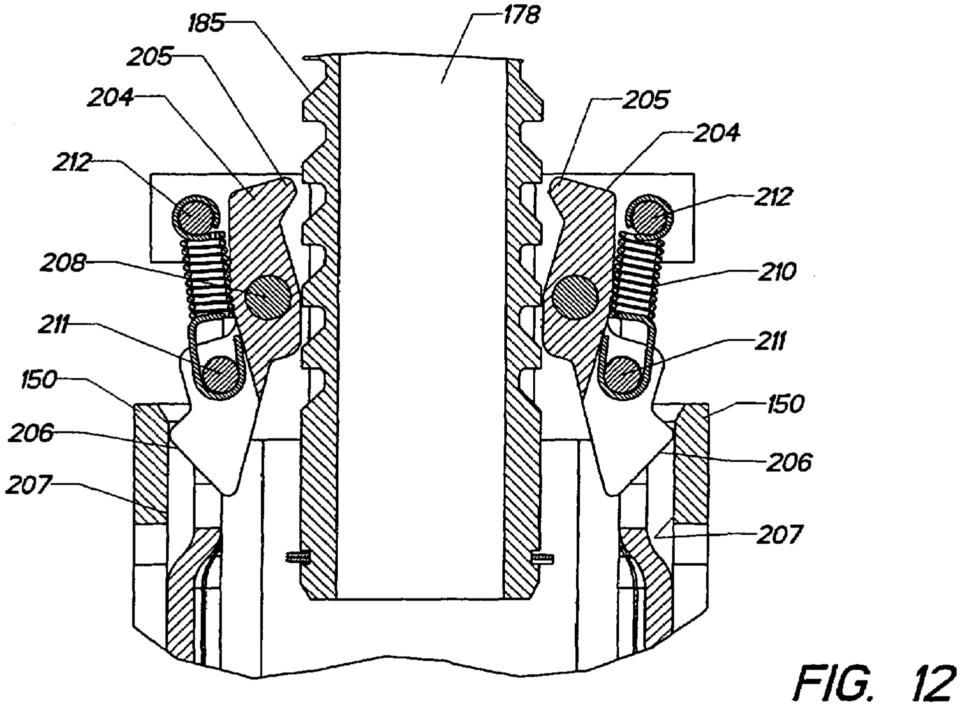
FIG. 12 is a sectional view similar to FIG. 11; illustrating the second stage lowered within the housing so that the upper dogs are disengaged with the ratchet teeth of the tubular shaft.

Referring now to FIGS. 11 and 12, the third stage tubular shaft 178 is automatically secured within the second stage ratchet shaft 156, whenever the upper end 160 of the ratchet shaft is extended above the upper end 150 of the tubular housing 146 (as in FIG. 11); and is automatically released within the ratchet shaft, whenever the upper end of the ratchet shaft is lowered within the upper end of the tubular housing (as in FIG. 12). This is accomplished by a pair of upper dogs 204, each pivotally retained in the separated sides between the front half 172 and the rear half 173 of the upper base 171. Each dog has an upper end 205 biased inwardly for engaging a respective side ratchet tooth 185 of the tubular shaft; and has a bottom portion with inclined outer sides 206 that are engagable with the inner side wall 207 of the tubular housing (for rotating the lower portions inwardly) thereby rotating the upper end of the dog outwardly into disengagement with the side ratchet teeth, to release the tubular shaft.

The left dog is somewhat "S" shaped and the right dog is somewhat "reverse S" shaped, with each dog having an aperture near the center thereof pivotally mounting on a dog pivot pin 208 extending laterally from front-to-back within the upper base 171. The upper end of each dog can be suitably biased inwardly by an extension spring 210 connected on a lower axle 211 located in the lower portion of the dog, wherein the lower axel is parallel with, and outboard from, the dog pivot pin; and the extension spring is connected at the upper end to and upper axel 212 within the separated flanges of the upper base, wherein the upper axel is parallel with, and outboard from, the dog pivot pin, and generally straight above the lower axel. The extension springs are designed to provide continuous tension on the upper dogs in the extended position of the tubular shaft, and remain slightly more extended for long life in the downward position of the tubular shaft, and for countless movements of the dogs for the life of the jack stand. The dogs are preferably manufactured with a front half and a rear half interconnected around the lower axel having central clearance for the extension spring, providing smooth even tension of the spring on the dog, and a robust durable movement of the dogs.

Referring again to FIGS. 8 and 13, the lift collar 186 includes a threaded vertical aperture 214 through the center thereof, and further includes a screw-out extension 216 having a vertical threaded shaft 217 extending downward therefrom and adapted to engage the threaded aperture in the lift collar. The screw-out extension 216 is similar to those previously described; having a threaded shaft about 0.50 inches in diameter and about four six inches in length. The screw-out extension is utilized to adjust the distance between the lift collar and the object to be lifted, for maximum lift and utility of the jack stand.

Consumer Trunk Jack

Figure 14:
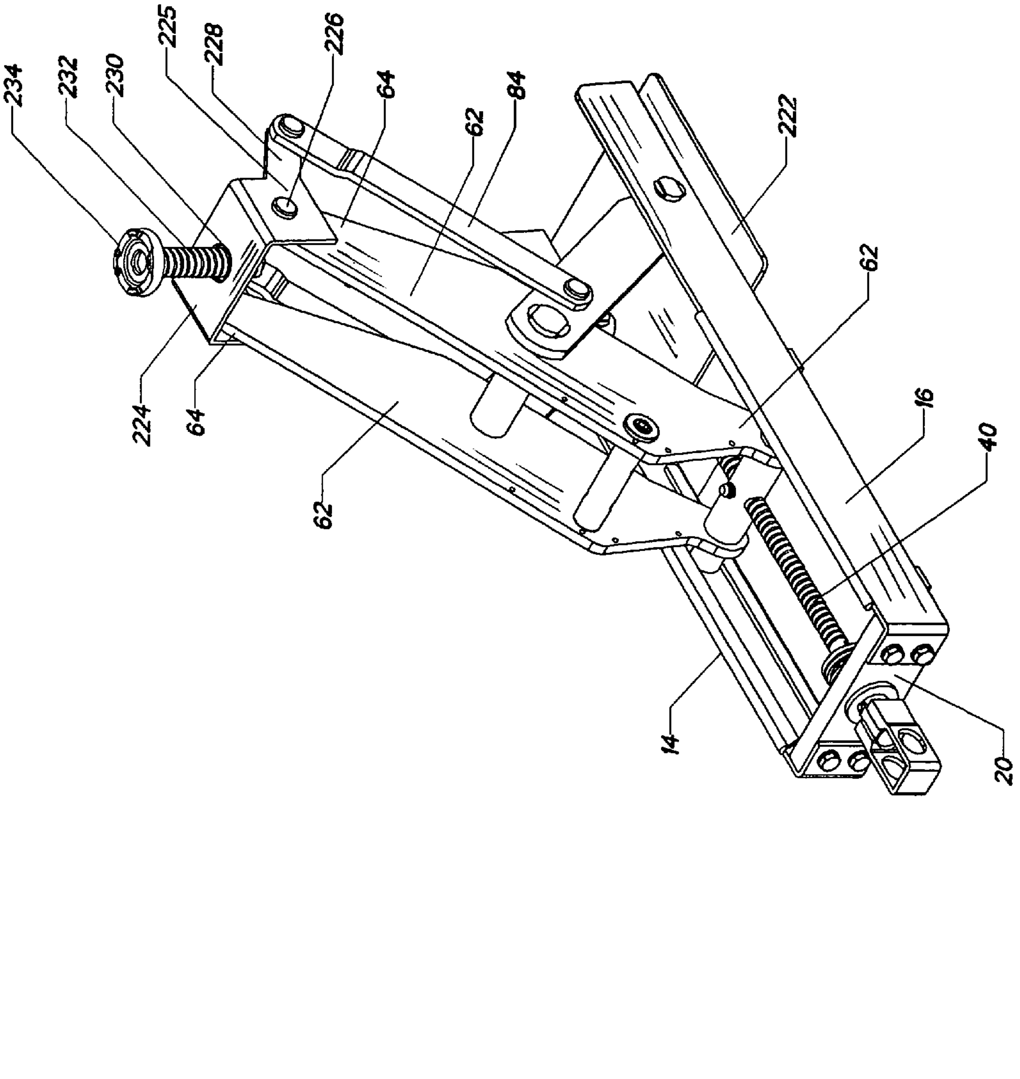
FIG. 14 is a top-front perspective view of a consumer trunk jack of the present invention.

Referring now to FIG. 14, a robust consumer trunk jack 220 is shown that utilizes many of the design and manufacturing features as previously described in reference to the rectangular frame and lifting mechanism of the power unit 10. The trunk jack does not utilize the jack stand 140, and thus a new forward support plate 222 is attached to the forward end of the frame, that does not include a "U" shaped opening (as in the forward support plate 18 of the power unit 10). The trunk jack does not utilize a slide forward bridge nor a pair of leveling pads (as in bridge 12 and pads 74 of the power unit), but rather has a lifting plate 224 to engage the corner of an automobile to be elevated by the trunk jack. The lifting plate comprises a generally flat rectangular upper plate (oriented horizontally over the lift arms), and has a pair of integral side flanges 225 extending downwardly therefrom with apertures therein, and is pivotally attached to the forward ends 64 of the lift arms 62 with suitable rivets 226. The side flanges further include lever arms 228 extending forward and downward at an angle of about 28 degrees (as in the lever arms 80 of leveling pads of the power unit.) and are pivotally attached to connecting links 84. The lifting plate further includes a central vertical threaded aperture 230 adapted to receive a threaded shaft 232 of a screw-out saddle 234 for adjusting the initial height of the lifting plate, as previously discussed regarding the screw-out saddles of the lift bridge 12, and the lift collar 186 Of the jack stand 140.

It is concluded that the foregoing DETAILED DESCRIPTION OF THE INVENTION provides a consumer power unit having components that are robust to manufacture and assemble. It further provides an automatic-slide-forward-bridge assembly having components that are robust to produce and assemble, and that are reliable and durable in use. It further provides a three-stage jack stand having a component that are robust to manufacture and assemble, that has extended elevation, and is reliable and durable in use. It further provides a trunk jack having components that are robust to manufacture and assemble, and is reliable and durable in use.

The invention claimed is:

1. A power unit for use with a jack stand comprising:

a rectangular frame base with a forward end having a horizontal forward support plate for receiving a jack stand therein and a rearward end having a vertical rear plate with a central aperture for receiving an actuator shaft therein, and having a left shoe with a longitudinal track on the inner side thereof, and having a right shoe with a longitudinal track on the inner side thereof;

a screw-threaded actuator shaft having a distal portion, and a proximal end extending through the aperture of the rear plate with the proximal end rotatably retained within the aperture and further for use with an external handle to facilitate rotation thereof;

a lateral axel having a central threaded aperture therein for receiving the distal end of said threaded actuator shaft; and having guide caps extending from the ends thereof into the respective left and right longitudinal track of the shoes, with said lateral axel slidably retained within the longitudinal tracks;

a pair of lift arms, acting in parallel, each having a forward end and a rearward end with the rearward end pivotally attached to said lateral axel adjacent the respective guide cap;

a pair of connecting arms, acting in parallel, each having a forward end pivotally attached near the forward end of the respective left shoe and right shoe of said frame base, and having a rearward end pivotally attached at a pivot point on said lift arm; and a pair of leveling pads, acting in parallel, each pivotally attached to the forward end of said respective lift arm for providing a level lifting platform.

2. The power unit as in claim 1, wherein the longitudinal track on the inner side of the left shoe is formed by an upper flange thereon folded-over inwardly into a double thickness upper guide path, and a lower guide plate is attached to the left shoe to provide a lower guide path of the longitudinal track, and wherein the longitudinal track on the inner side of the right shoe is formed by a upper flange thereon folded-over inwardly into a double thickness upper guide path, and a lower guide plate is attached to the right shoe to provide a lower guide path of the longitudinal track.

3. The power unit as in claim 1, wherein the pivot point of the rear end of said respective connecting arm is at a distance from the rearward end of said lift arm that is about equal to the length of said connecting arm.

4. The power unit as in claim 1, wherein said horizontal forward support plate of said frame base includes a "U" shaped opening at the forward end thereof to facilitate engagement with the jack stand.

5. The power unit as in claim 1, wherein each said leveling pad comprises a rectangular plate oriented vertically having an upper surface with a flange extending outward therefrom.

6. The power unit as in claim 1, wherein each said leveling pad comprises a rectangular plate oriented vertically having an having a forward edge, a rearward edge, and an upper surface with a flange extending outward therefrom, and having a lever arm extending downward and forward from the forward edge of the plate with each lever arm having a forward end thereof; and a pairs of connecting links, acting in parallel, each having one end pivotally connected to the forward end of the respective lever arm, and having one end pivotally connected to a point on the connecting arm, so that the leveling pad remains substantially horizontal on said lift arms.

7. The power unit for use with a jack stand as in claim 6, that is also convertible for use as a load-lifting jack, further comprising a lift bridge adapted to be positioned on the forward ends of said lift arms, whereby said power unit is operable as a load lifting jack; and said bridge is further adapted to be displaced to a rearward position on said lift arms, whereby the power unit is operable for use with the jack stand.

8. The power unit as in claim 7, wherein said bridge comprises a rectangular plate having an upper rectangular surface, a bottom surface, a forward end and a pair of sides, with each side having an inner channel for engaging the outward flange of respective said leveling pad and each side having a finger extending rearward from the rectangular plate with a flange extended downward for abutting the rearward edge of said leveling pad.

9. The power unit as in claim 8, wherein the rectangular plate of said bridge has a vertical threaded aperture through the center thereof; and further includes a screw-out saddle having a threaded shaft extending downward therefrom for engaging the threaded aperture in the plate.

10. The power unit as in claim 9, wherein said bridge is an automatic slide-forward-bridge, wherein the bottom surface thereof has a pair of lateral flanges extending downward therefrom with apertures therein, further including:

a lateral pivot pin retained within the apertures of the lateral flanges;

a pair of tubular bushing guides having forward ends pivotally attached to the lateral pivot pin and having rearward ends extending longitudinally and parallel between said lift arms; and a lateral support axel attached between the upper rearward ends of said lift arms; further including a pair of guide pins having rearward ends attached to said lateral support axel and having forward ends inserted within the rearward ends of said tubular bushing guides, and telescopically extendable and retractable therein;

a pair of compression springs each positioned on and between the rearward end of said respective guide pin and the forward end of said respective tubular bushing guide, thereby biasing the bridge into the forward position, and compressible so that the bridge can be pushed rearward on the upper surface of said lift arms.

11. The power unit as in claim 9, wherein said bridge is an automatic slide-forward-bridge, wherein the bottom surface thereof has a pair of lateral flanges extending downward therefrom with apertures therein, further including:

a lateral pivot pin retained within the apertures of the lateral flanges;

a first pair of tubular sleeves having forward ends pivotally attached to the lateral pivot pin and having rearward ends extending longitudinally and parallel between said lift arms; and a lateral support axel attached between the upper rearward ends of said lift arms; further including a second pair of tubular sleeves having rearward ends attached to said lateral support axel and having forwards ends inserted within the respective rearward end of said first pair of sleeves, and telescopically extendable and retractable therein;

a pair of compression springs each positioned within the respective first and second sleeves, thereby biasing the bridge into the forward position, and compressible so that the bridge can be pushed rearward on the upper surface of said lift arms.

12. The power unit of claim 11 wherein each said lift arms further includes an inward flange extending longitudinally along the upper surface thereof, at the location of the rearward position for said lift bridge; and wherein the inner channel of said lift bridge is further engagable with the inward flange of said lift arm.

* * * * *